United States Patent

[11] 3,573,346

[72] Inventor Harry A. Appleby
 Cleveland, Ohio
[21] Appl. No. 844,394
[22] Filed July 24, 1969
[45] Patented Apr. 6, 1971
[73] Assignee Preformed Line Products Company
 Cleveland, Ohio

[54] STRAIN RELIEF COUPLING
 14 Claims, 12 Drawing Figs.
[52] U.S. Cl. .................................................. 174/71,
 24/122.6, 24/126, 174/76, 174/79, 174/93
[51] Int. Cl. ........................................................ H02g 15/02,
 H02g 15/08, F16g 11/00
[50] Field of Search ............................................ 174/(H.P.),
 70, 71, 76, 79, 84.3, 90, 91, 94, 94.1, 93; 287/82,
 114; 24/122.3, 122.6, 126, 126 (K), 126 (L),
 126.3

[56] References Cited
 UNITED STATES PATENTS
 206,321 7/1878 Heaton ........................ 24/126(.3)
 294,392 3/1884 Kortum ........................ 24/126(L)
 1,867,043 7/1932 Wirschitz ..................... 24/126(.3)
 3,007,243 11/1961 Peterson ....................... 174/(H.P.)
 3,226,470 12/1965 Bryant ......................... 174/79
 3,450,829 6/1969 Paul ............................ 174/79X
 FOREIGN PATENTS
 1,074,883 4/1954 France ......................... 174/90
 190,769 12/1922 Great Britain ................ 24/126(.3)
 584,478 10/1958 Italy ............................ 24/126

Primary Examiner—Laramie E. Askin
Attorney—Hume, Clement, Hume & Lee

ABSTRACT: A strain relief coupling for a cable or the like comprises a housing having an elongated, tapered passageway extending therethrough. Means are adapted to be fixedly secured to the cable for defining a protuberance thereon of a diameter intermediate that of the opposed ends of the housing passageway. The cable and its associated protuberance means are slidably received within the housing with the protuberance means securely seating against the tapered sidewalls of the housing passageway thereby to provide an effective securance of the cable to the housing. Other features and embodiments are disclosed.

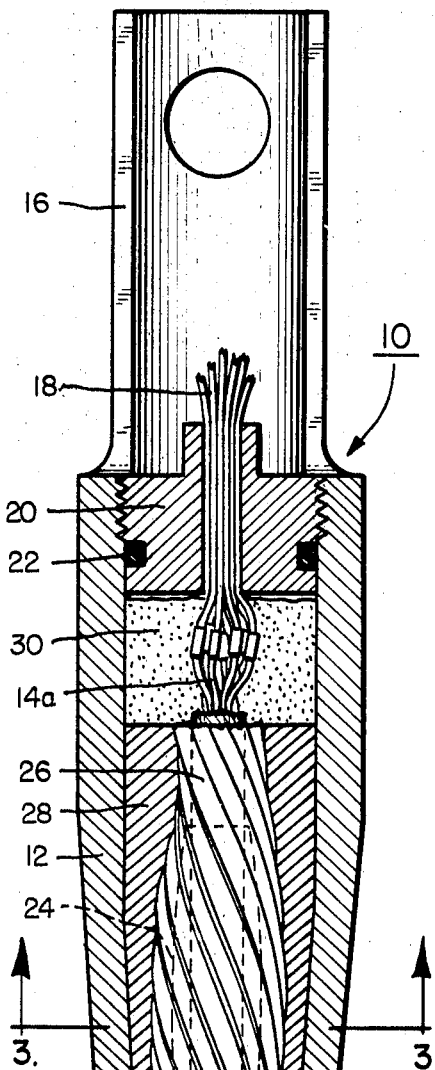
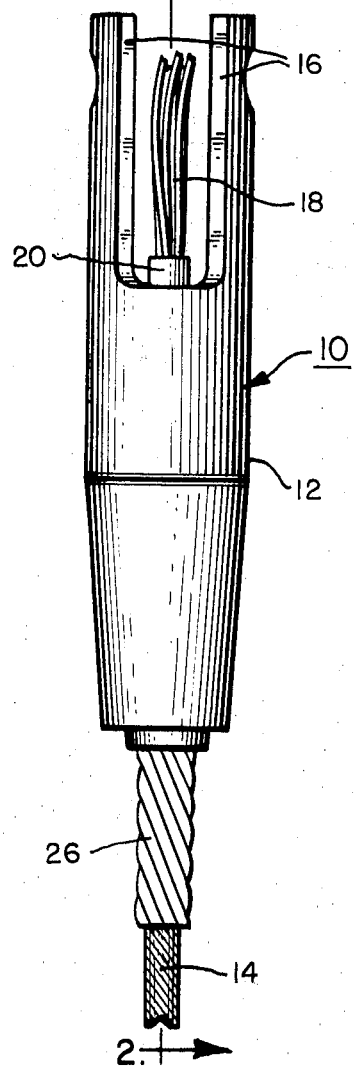
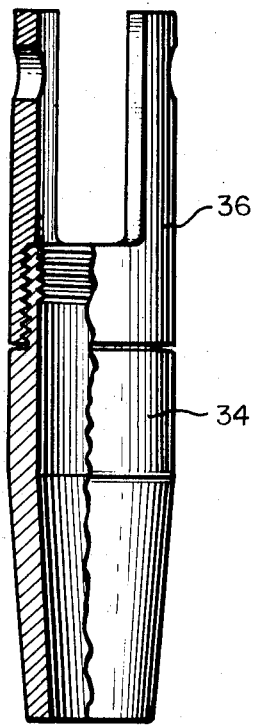
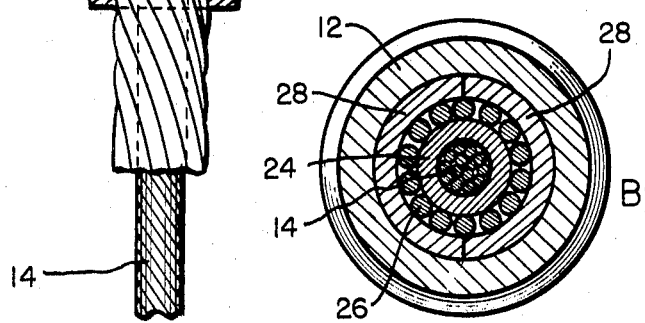

STRAIN RELIEF COUPLING

The present invention relates generally to strain relief couplings for load bearing cables or the like. The invention is particularly useful in oceanographic instrumentation systems wherein electrical conductors running along the core of a load bearing cable must be connected to electronic sensing and control instruments absent excessive stress and under hermetically sealed conditions. Accordingly, the invention will be described in the foregoing context although its more general utility will be recognized by those skilled in the art.

SUMMARY OF THE INVENTION

The present invention provides a strain relief coupling of a comparatively simple and economical construction but yet which has been found to perform with extraordinary reliability under adverse conditions and over prolonged periods of time.

More particularly, the present invention is directed to a strain relief coupling for a cable or the like comprising an elongated housing means having an interior passageway of a predetermined diameter at one end and tapering to a predetermined smaller diameter at an opposite end, the smaller diameter being in excess of the diameter of the cable. Means, adapted to be secured to the cable, are provided for defining a protuberance on the cable of a diameter intermediate the diameters of the opposed ends of the housing passageway. The cable and protuberance means are received within the housing means with the protuberance means securely seating against the tapered sidewalls of the housing passageway thereby to provide in the vicinity of the protuberance means an effective securance of the cable to the housing means. A connector fitting is coupled to the housing to provide a means for effecting a mechanical connection to the housing means.

According to a further feature of the invention, the basic coupling structure is adapted to selectively receive any one of a plurality of different connector fittings thereby permitting use of the basic coupling structure in a wide range of environments. Additionally, versatility is provided by utilizing a pair of the basic coupling structures in effecting an interconnection between a pair of cable sections. Such is desirable, for example, in providing electronic pickoffs for sensing instruments at a sequence of spaced points along the length of a cable.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGS. of which like reference numerals identify like elements and in which:

FIG. 1 is a side elevation of a strain relief coupling or dead end device embodying the teachings of the present invention;

FIG. 2 is a longitudinal section of the coupling taken along lines 2-2 of FIG. 1;

FIG. 3 is a cross-sectional view taken along lines 3-3 of FIG. 2;

FIG. 4 is a fragmentary view of the housing portion of the coupling and illustrating one form of removable connector fitting therefor;

FIG. 5 is a view similar to FIG. 4 but illustrating a different form of removable connector fitting;

DESCRIPTION OF THE PREFERRED EMBODIMENTS

Figure 6A:
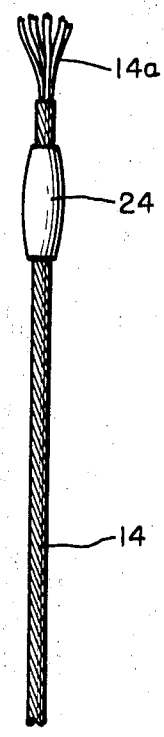
FIGS. 6A—6F illustrate in semischematic form the sequence of steps in assembling the strain relief coupling of the invention.

Referring now to FIG. 1, the strain relief coupling 10 there illustrated comprises an elongated, hollow housing means 12, the lower end of which is adapted to receive and securely retain one end of a cable 14. The upper end of the housing means 12 is provided with an integral connector fitting in the form of a clevis 16 for effecting a mechanical connection between the coupling 10 and an oceanographic instrumentation buoy or the like (not shown). In the present instance, the cable 14 is of a type having a plurality of electrical signal conductors extending along its core. Strain free electrical connections are made with these conductors by a series of leads 18 extending from the instrumentation buoy (not shown) into a hermetically sealed splicing cavity of the housing means 12.

The strain relief coupling 10 of the invention may be appreciated in further detail by reference to FIG. 2. The housing 12 is of generally cylindrical contour along its upper portion with the lower portion assuming a gradually conical taper; an interior passageway extending through the full length of the housing is of like configuration. More particularly, the upper end of the housing passageway is of a first predetermined diameter but the passageway tapers to a predetermined smaller diameter at its opposite end, the smaller diameter being in excess, however, of the diameter of the cable 14. The upper end of the housing passageway is provided with a removable closure plug 20 that is threadably received by the housing 12. A conventional O-ring 22 situated in a circumferential groove of the plug 20 provides a hermetic seal between the plug and the housing 12. The electrical leads 18 enter the housing 12 through a central bore in the closure plug 20 thereby to effect in the interior of the housing an electrical connection with the leads extending from the core of the load bearing cable 14, as will presently be explained. A hermetic seal is provided about the leads 18 by a suitable sealing compound 30 or the like.

The cable 14 enters the passageway of the housing 12 at its lower end and extends over the major length thereof, terminating only a relatively small distance below the underside of the closure plug 20. The cable 14 is fixedly secured in its illustrated position by means secured to the cable and which cooperate with the narrowing or tapered sidewalls of the housing 12 to preclude withdrawal of the cable therefrom. More particularly, as seen in phantom outline in FIG. 2, a bump or enlargement is formed on the cable 14 by an ellipsoidal member 24 having a central bore for passing the cable 14. The ellipsoidal member 24 is fixedly positioned with respect to the cable 14 by application of a plurality of helically preformed armor rods 26 about the ellipsoid and cable in a tightly encircling relation, as is shown in FIGS. 2 and 3. The methods and means for forming protuberances on cables is known to the art and such are disclosed and claimed in Pat. No. 3,007,243, Peterson, assigned to the same assignee as the present invention.

The ellipsoidally contoured bump cojointly formed by the member 24 and the overlying armor rods 26 is matched to the tapered contour of the interior sidewalls of the housing 12 by a transitional inner shell 28. The shell 28 is in fact composed of two half-sections, as seen in FIG. 3, and is provided with an interior contour conforming to the protuberance on the cable while having an exterior surface contour matching that of the tapered interior sidewalls of the housing 12. In this regard, it is to be noted that in the present instance that the interior sidewalls of the housing 12 do not taper continuously from the upper to the lower end of the housing structure but rather are straight for approximately one-half the length of the housing and then commence a gradual but uniform taper over the remaining length of the housing. Although the present arrangement is preferred, it will be recognized by those skilled in the art that the particular manner in which the interior walls of the housing 12 are tapered is not critical to the invention.

By means of the member 24, the armor rods 26 and the shell 28, stress forces on the cable 14 are translated to the housing 12 and thence to the clevis 16 and an attached support, not shown. Thus, the electrical signal leads 14a extending along the core of the cable 14 are electrically joined to the conductors 18 under stress free conditions within the confines of a splicing cavity formed between the base of the plug 22 and the upper surface of the shell 28.

A potting compound 30 such as epoxy or urethane fills the space of the splicing cavity to both mechanically stabilize and hermetically seal the junctures of the electrical signal conductors. It is also desirable to encourage flow of the potting compound into the region of the protuberance means so as to filter the interstices of the helically preformed rods as well as any voids or spaces between the shell 28, the armor rods 26, and the ellipsoidal member 28. Where the potting compound is a liquid, this result may be accomplished by merely permitting the liquid to seep into the crevices and voids or a vacuum pump may be connected to the lower end of the coupling 10 to aid in drawing the potting compound downwardly into the lower reaches of the housing. On the other hand, if the potting compound is of a pastelike consistency, it is preferably applied about the armor rods during the course of assembling the coupling 10. In any event, it has been found that the presence of the potting compound about the rods 26 and member 28 precludes abrasive movement therebetween and thus materially increases the useful life of the coupling 10, particularly in applications wherein high, cyclical loads are encountered over prolonged time periods.

In low load and short time span applications, the potting compound 30 may be omitted which, of course, facilitates disassembly of the coupling structure. It has been found that absent the potting compound, the ultimate breaking strength of the coupling is substantially unaffected but, as previously stated, the endurance of the coupling 10 is materially reduced where the potting compound is not applied about the rods and ellipsoidal member.

Before considering in greater detail the manner of assembling the coupling of FIG. 2, it is convenient to first consider the somewhat modified embodiments of the coupling structure shown in FIGS. 4 and 5, respectively. Specifically, the housing structure 34 of the coupling of FIG. 4 is substantially identical to the housing 12 of the embodiment of FIGS. 1—3 excepting that the upper end of the housing is provided with a threaded outer surface on which is threadably received a removable connector fitting or clevis 36. Thus, the basic housing 34 and the associated structure of the coupling may easily and promptly be accommodated with any of a variety of different connector fittings such as further exemplified by the single eyelet connector fitting 38 illustrated in assembled relation with the housing 34 in FIG. 5.

Referring now sequentially to FIGS. 6A—6F, the construction and manner of assembling the strain relief coupling of the invention may be understood in greater detail. Specifically, as seen in FIG. 6A, the cable 14 and the electrical signal leads 14a have each been cut to appropriate lengths and the hollow ellipsoidal member 24 slideably received on the cable in a suitable position for securance thereto. Although not shown, the housing 12 has previously been slipped over the cable.

Figure 6B:
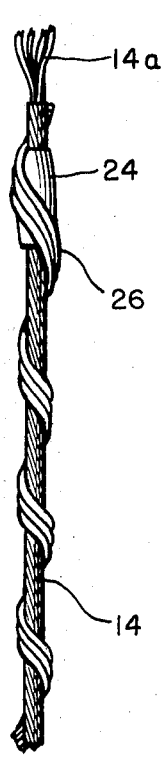
Figure 6C:
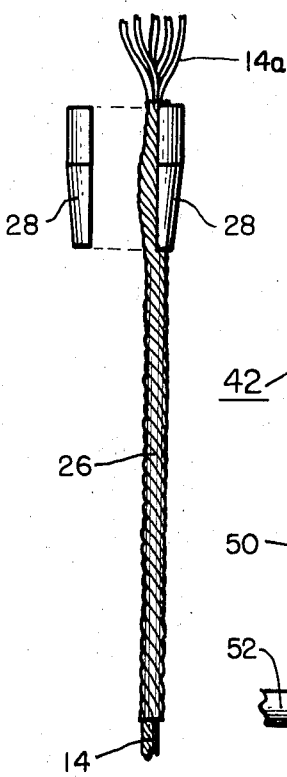

For ease in effecting securance of the member 24 to the cable, the ellipsoidal contour of the member 24 is preferred although it will be understood that other configurations may be employed if desired. In FIG. 6B, a first grouping of helically preformed armor rods of a predetermined internal diameter and pitch length are applied about the cable 14 and the member 24. In order to effect a firm gripping of the cable 14 and thereby securely locate the member 24, the armor rods 26 extend a substantial distance below the member 24 although of necessity the distance which these rods may extend above the member 24 is rather limited. Additional groupings of armor rods are applied about the cable 14 and member 24 until a full lay of the helical elements is formed as shown in FIG. 6C. The techniques for applying helical armor rods about protuberances on cables is fully disclosed in the earlier mentioned Peterson patent and therefore will not be considered in further detail herein. The two sections of the contoured shell 28 may now be applied over the bump on the cable; the two sections of the shell 28 are suitably secured to one another by tape or the like.

Figure 6D:
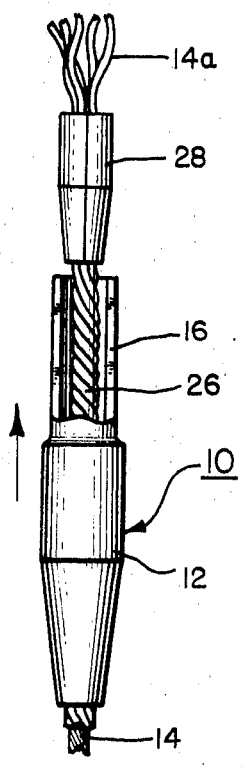
Figure 6E:
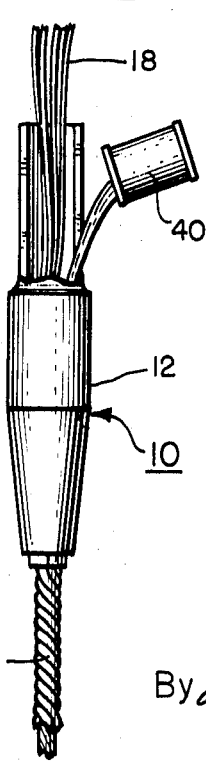
Figure 6F:
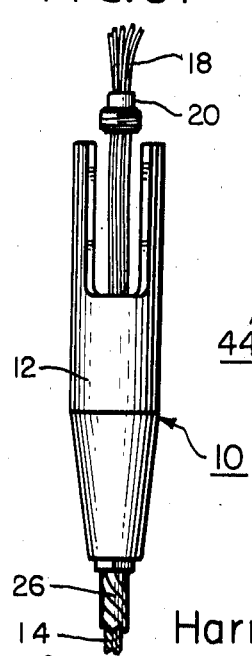

The housing 12 is now slid upward and over the contoured shell 28 until the shell securely seats against the tapered sidewalls of the housing, as represented in FIGS. 6D and 6E. The electrical leads 18 are, at some convenient stage during the assembly procedure above described, spliced to the signal conductors 14a. The connections between the conductors 14a, 18 are now situated within the confines of the splicing cavity at the upper end of the housing passageway and a potting compound, schematically illustrated as being poured from a container 40, is introduced into the splicing cavity to fill the full volume thereof. The potting compound solidifies to maintain the connectors in a desired spaced relation with suitable mechanical stability and under hermetically sealed conditions. As previously mentioned, it is preferred for most applications that the potting compound be permitted to seep into the interstices of the armor rods. The assembly is completed by now sliding the closure plug 20 over the leads 18 and screwing the plug into place.

Figure 7:
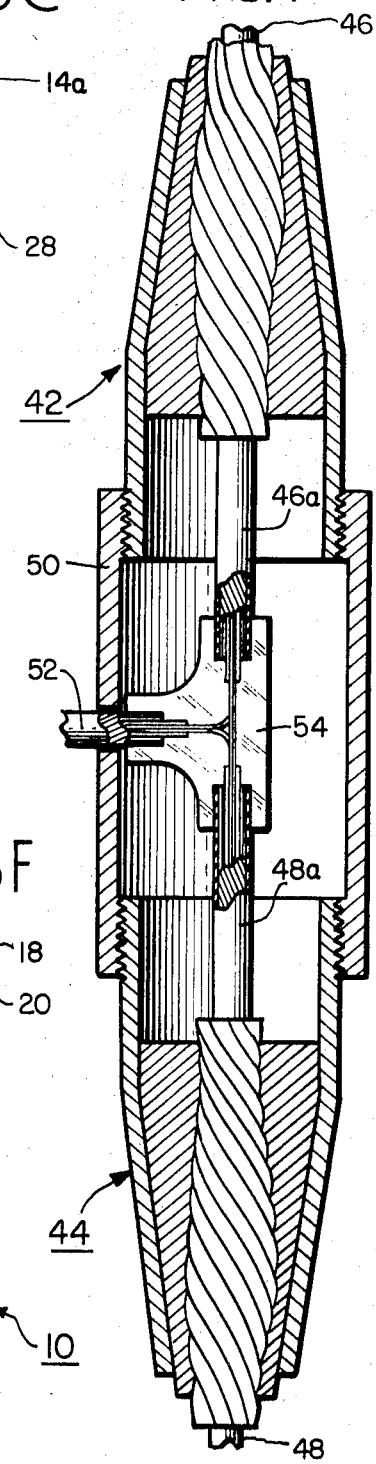
FIG. 7 is a longitudinal section of another embodiment of the coupling structure of the invention of a type particularly suited for joining a pair of cable sections to one another.

A further embodiment of the strain relief coupling of the invention is illustrated in FIG. 7. Specifically, the embodiment there illustrated is adapted for interconnecting a pair of cable sections 46, 48 and to this end employs a pair of strain relief couplings, generally designated by the reference numerals 42 and 44, which are each identical to the basic structure of the strain relief coupling 10 above described. The oppositely facing and coaxially aligned couplings 42 and 44 are joined to one another by a sleeve 50 which is threadably secured in like fashion to each of the couplings 42 and 44. Selected ones of the electrical signal leads 46a, 48a extending along the cores of the respective load bearing cables 46 and 48 are connected to control or sensing instruments (not shown) by an insulated cable 52 which extends through a circular aperture in the circumferential wall of the sleeve 50. More specifically, the selected leads of the signal conductors 46a, 48a are spliced to the leads of the sensing or control device cable 52 through a conventional T-type connector block 54, the connector block 54 being positioned within the center of the annular splicing cavity defined by the sleeve 50. Thus, with the present embodiment of the invention, a series of stress free electrical signal pickoffs may be made at a sequence of spaced intervals along a load bearing cable without impairing the load carrying capability of the cable.

While particular embodiments of the present invention have been shown and described, it is apparent that various changes and modifications may be made, and it is therefore intended in the following claims to cover all such modifications and changes as may fall within the true spirit and scope of this invention.

I claim:

1. A strain relief coupling for a cable of the type having at least one electrical signal conductor extending through the core of said cable, comprising:
   elongated housing means having an interior passageway of a predetermined diameter at one end and tapering to a predetermined smaller diameter at an opposite end, said smaller diameter being in excess of the diameter of said cable;
   means secured to said cable for defining a protuberance on said cable of a diameter intermediate the diameter of the opposed ends of said housing passageway, said cable and protuberance means being received within the lower part of said housing means with said protuberance means securely seating against the tapered sidewalls of said housing passageway thereby to provide in the vicinity of said protuberance means an effective securance of said cable to said housing means and the upper part of said housing passageway defining a splicing cavity for said at least one electrical signal conductor;
   a closure cap secured to said housing at said one end and sealing said splicing cavity; and
   a connector fitting coupled to said housing to provide a means for effecting a mechanical connection to said housing means.

2. The strain relief coupling of claim 1 in which said connector fitting is removably secured to said housing means for permitting an interchange of such fittings.

3. The strain relief coupling of claim 1 in which said connector fitting is integral with said housing means.

4. The strain relief coupling of claim 1 in which said protuberance means comprises an ellipsoidal member having a central bore and passing said cable and a plurality of helically preformed elements of a predetermined internal diameter and pitch length wrapped in tightly encircling relation about said ellipsoidal member and extending along said cable for respective predetermined distances in either direction therefrom and fixedly securing said ellipsoidal member to said cable.

5. The strain relief coupling of claim 4 in which said protuberance means further includes an inner shell interposed between the helical elements overlying said ellipsoidal member and the tapered sidewalls of said housing passageway and having an interior surface contour conforming to said ellipsoidal member and an outer surface contour conforming to that of said housing sidewalls.

6. The strain relief coupling of claim 5 in which said splicing cavity and the interstices of said helically preformed elements and said ellipsoidal member are filled with potting compound.

7. The strain relief coupling of claim 6 in which said housing means, said ellipsoidal member and said shell are formed of a hard metal.

8. A strain relief coupling for joining cable sections or the like, comprising:
- a pair of elongated housing means each having an interior passageway of a predetermined diameter at one end and tapering to a predetermined smaller diameter at an opposite end, said smaller diameter being in excess of the diameter of said cable sections;
- a pair of similar protuberance means fixedly secured to respective ones of said cable sections for defining protuberances on said cable sections of a diameter intermediate the diameters of the opposed ends of said housing passageways and each of said similar means comprising an ellipsoidal member having a central bore passing an associated one of said cable sections and a plurality of helically preformed elements of a predetermined internal diameter and pitch length wrapped in tightly encircling relation about said ellipsoidal member and extending along said associated cable section for respective predetermined distances in either direction therefrom and fixedly securing said ellipsoidal member to said cable section, said cable sections and associated protuberance means being received within respective ones of said housing means with said similar protuberance means securely seating against the tapered sidewalls of respective ones of said housing passageways thereby to provide in the vicinity of each said protuberance means an effective securance of said cable sections to said housing means; and
- connector means comprising a hollow conduit section joining said one ends of said housing means.

9. The strain relief coupling of claim 8 in which said cable sections each include at least one electrical signal conductor extending through their respective cores and in which said connector means is joined in sealed relation to said pair of housing means and defines a closed splicing cavity for interconnecting said electrical conductors.

10. The strain relief coupling of claim 9 in which said hollow conduit of said connector means is provided with an aperture at a predetermined location on its circumference for passing predetermined ones of said electrical conductors.

11. The strain relief coupling of claim 10 in which said hollow conduit is removably secured to each of said housing means.

12. The strain relief coupling of claim 11 in which each of said protuberance means further includes an inner shell interposed between the helical elements overlying said ellipsoidal member and the tapered sidewalls of an associated one of said housing passageways, and having an interior surface contour conforming to said ellipsoidal member and an outer surface contour conforming to that of said housing sidewalls.

13. The strain relief coupling of claim 12 in which the volume intermediate the upper ends of said protuberance means and said one ends of said respective housing means as well as the interstices of said helically preformed elements and said ellipsoidal members are filled with a potting compound.

14. The strain relief coupling of claim 13 in which said pair of housing means, said ellipsoidal members and said helically preformed members are formed of a hard metal.